Figure 1:
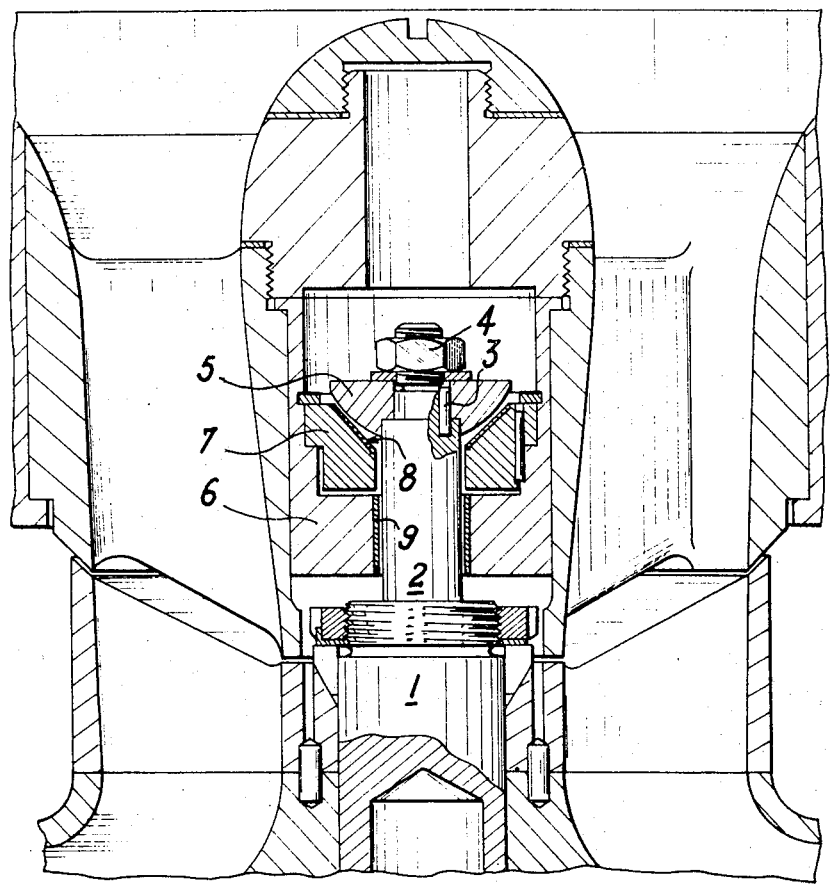

United States Patent [19]

Bourgain et al.

[11] 3,765,735

[45] Oct. 16, 1973

[54] BEARING DEVICE FOR A ROTATING SHAFT

[76] Inventors: Louis Bourgain, 10 bld. General Exelmans, Le Chesnay; Gaspard Dreyfus, 3, rue des Gatines, L'Hay les Roses; Marcel Le Nabour, 5bis, avenue du General Bonaparte, Maisons Lafitte; Georges Rouquie, 12, rue Rene Dorme, Fontenay le Fleury, all of France

[22] Filed: Feb. 8, 1972

[21] Appl. No.: 224,568

[30] Foreign Application Priority Data
Feb. 9, 1971 France .............................. 7104241

[52] U.S. Cl. .............................................. 308/140
[51] Int. Cl. .......................................... C16c 23/00
[58] Field of Search .................. 308/1, 9, 140, 141, 308/6 R, 4 R, 72

[56] References Cited
UNITED STATES PATENTS
2,765,657 10/1956 Gilmore ............................ 308/140
3,353,877 11/1967 Lindeboom ............................ 308/9
3,672,733 6/1972 Arsenius et al. ...................... 308/9

FOREIGN PATENTS OR APPLICATIONS
517,868 10/1955 Canada .............................. 308/140

*Primary Examiner*—Charles J. Myhre
*Assistant Examiner*—R. H. Lazarus
*Attorney*—Cameron, Kerkam & Sutton

[57] ABSTRACT

The bearing device for a rotating shaft which is lifted and centered by means of fluid-film bearings of the self-generating pressure type, comprises a pivot in the form of a spherical cap having an axis which coincides with the rotating shaft and rigidly fixed to this latter, a supporting track of self-lubricating material for the cap having a profile of revolution which is widened-out towards the flat face of the spherical cap. The axis of the track coincides substantially with the axis of the rotating shaft and the spherical cap bears on and co-operates with the track during periods of starting and stopping of the shaft.

1 Claim, 2 Drawing Figures

Patented Oct. 16, 1973 3,765,735

BEARING DEVICE FOR A ROTATING SHAFT

This invention relates to a bearing device for a rotating shaft and especially for a shaft which is lifted and centered by means of fluid-film bearings of the self-generating pressure type.

It is known that bearings and thrust-bearings of the fluid-film type are commonly employed in rotating machines in order to permit supporting and centering of the shaft within the fixed portion or casing of the machine. In a general manner, whether these bearings are of the hydrostatic or hydrodynamic type, they are capable of performing their function only above a predetermined speed of rotation which depends on the particular characteristics of the machine under consideration; this suitable operating speed corresponds in fact to the generation of a sufficient pressure of supply fluid in the case of the bearings of the first type and, in the case of the second type, to a relative velocity of the bearing surfaces which is sufficiently high to produce a suitable pressure field.

It is therefore clearly necessary in all cases to ensure centering and lifting of the rotating shaft by mechanical means during periods of starting and stopping of the machine. By way of example, it is common practice to make use of bearings having a complex structure, of the type which operates as a ball bearing during stationary periods and as a fluid bearing at the time of start-up as soon as a sufficient speed of rotation is attained by the rotating shaft. However, apart from the difficulties presented from the point of view of technological design, bearings of this type frequently result in instabilities and vibrations which are unacceptable.

The aim of this invention is to provide a device which overcomes the disadvantages mentioned above by producing at the time of periods of starting and stopping, on the one hand an appreciable reduction of friction forces which generate vibrations and on the other hand a substantial increase in the pendular stiffness of the rotating shaft, which is a value defining the contribution of the weight of the rotating portion to the centering of this latter with respect to the stationary portion of the machine.

To this end, the device under consideration is mainly characterized in that it comprises a supporting track having a flared profile of revolution and preferably having the shape of a cone frustum rigidly fixed to the stationary portion of the machine and a bearing member or pivot rigidly fixed to the rotating portion and having the shape of a spherical component which is intended to rest on and cooperate with said track at the time of periods of starting and stopping of the machine.

Moreover, and in accordance with another characteristic feature, the starting device which is proposed can advantageously be combined with an ancillary safety component formed by means of a ring or collar of self-lubricating metal, thereby further limiting the vibrations of the rotating portion during periods of starting and stopping by virtue of a minimum clearance formed between said ring and the shaft of the machine.

Further characteristic features of the device according to the invention, which will serve to emphasize the advantages offered by the device in comparison with the known systems which have been employed up to the present time, will become apparent from the following description of one exemplified embodiment of the invention which is given by way of indication and not in any limiting sense.

In the accompanying single sheet of drawings, FIG. 1 is a diagrammatic vertical sectional view of a starting device for a rotating machine, as constructed in accordance with the invention.

Figure 2:
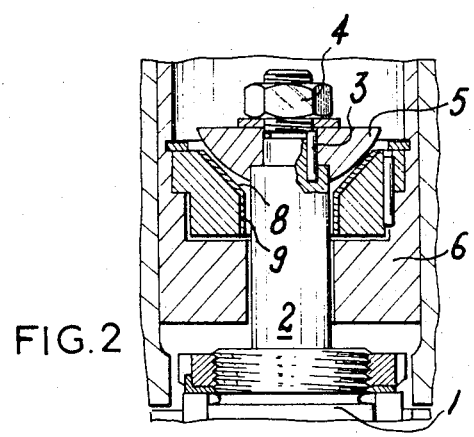

FIG. 2 is a diagrammatic sectional view of an alternative form of construction of the device illustrated in FIG. 1.

As can be seen from FIG. 1, there is represented in vertical cross-section the end of the shaft 1 of a rotating machine such as a motor-driven compressor, for example. The shaft 1 is provided with an axial extension 2 on which is rigidly fixed by means of a locking-pin 3 and a nut 4, a pivot 5 having the shape of a spherical cap, the axis of which coincides with the axis of the shaft 1. This latter is mounted within the stationary portion of the machine, only part of which appears in the figure and which comprises a support 6 for a ring 7, said ring being machined in such manner as to provide at the top portion thereof a flared opening having the shape of a cone frustum. As shown in the arrangement which is illustrated in the figure, the pivot 5 rests directly on the frusto-conical portion of the ring 7 which forms a supporting track 8 at the time of stoppage of the machine, especially under the action of the weight proper of the shaft 1. The track 8 is preferably formed by placing over the flared opening of the ring 7 a suitable thickness of self-lubricating material having high resistance to friction; by way of example, a material of this type can be "D.U." metal, that is to say "fluor bearing" graphite.

It is also apparent from FIG. 1 that the supporting member 6 is provided with a collar 9 within the bore through which the extension 2 of the shaft 1 passes, said collar being also formed of self-lubricating material for limiting the radial vibrations of the shaft and consequently protecting the fluid-film bearing (not shown) which is intended to support the rotating shaft when the normal running speed has been attained. It should be noted that the collar 9 can be placed at any location other than that chosen in the embodiment of FIG. 1. In the alternative form which is illustrated in FIG. 2, for example, the collar 6 is carried directly by the ring 7 and forms an extension of the frusto-conical track 8. In other alternative forms, this collar could also be placed at the other end of the rotating shaft while similarly performing its function of limiting radial vibrations.

The operation of the starting device according to the invention can be deduced from the foregoing description : at the time of stopping and during starting periods, the rotating shaft bears by means of the pivot 5 against the frusto-conical track 8 of the ring 7. At the time of starting of the machine, these two components are in rubbing contact with each other; as the speed increases as a result of the reaction of the rotating shaft, for example on a fluid cushion bearing which is not shown in the figures, so the shaft is lifted and the pivot 5 moves away from the conical track. The shaft is then supported by means of the self-supplied fluid-film bearing or bearings of the machine. During these periods of starting and stopping, centering of the shaft is effected directly by cooperation of the frusto-conical track and of the pivot whilst the bottom collar limits accidental radial vibrations which are liable to occur when the rotating shaft is supported by its fluid bearings at normal running speed.

Among the advantages of the device according to the invention, particular emphasis should be laid on the improvement provided by the device in regard to the pendular stiffness of the rotating shaft. In fact, the spherical pivot and the frusto-conical track which serves to support the rotating shaft are always in contact along a circumference which is centered on the axis of the rotating shaft. Under these conditions, the radial components of the friction forces have a zero resultant whilst the tangential components are symmetrical with respect to the axis of rotation, thereby removing any danger of vibrations during operation.

It can also be noted that the degree of wear of the frusto-conical track, of the safety collar and of the spherical pivot can always be reduced to very low values, especially if the spherical pivot is formed of very hard and highly polished material.

Finally, it is useful to note that the frusto-conical track and the spherical pivot must always be constructed of different materials in order to withstand without any danger of seizure the impact of the rotating shaft as this latter falls back during slowing-down and stopping of the machine.

Moreover, a supporting track having a frusto-conical profile is illustrated in the figures but it would not constitute a departure from the invention if the frusto-conical profile were replaced by a profile which is progressively flared towards the flat face of the pivot 5 in the form of a spherical cap, provided that this profile is of revolution about the axis of the installation.

What we claim is :

1. A bearing device for a rotating shaft and especially for a shaft which is lifted and centered by fluid-film bearings of the self-generating type, comprising a pivot having the shape of a spherical cap rigidly fixed to a rotating shaft and the axis of which coincides with the axis of the rotating shaft, and a frusto-conical supporting track for said pivot of self-lubricating material, said track opening-out to receive said spherical cap and having an axis which coincides substantially with the axis of the shaft, said spherical cap resting on and cooperating with said track during starting and stopping of rotation of the shaft, said device including a ring of self-lubricating metal fixed on an internal wall of a bore through which the rotating shaft passes, the internal diameter of said ring being only slightly larger than the diameter of the rotating shaft where surrounded by said ring.

* * * * *